(12) United States Patent
Thomae et al.

(10) Patent No.: US 12,222,081 B2
(45) Date of Patent: Feb. 11, 2025

(54) ILLUMINATION DEVICE FOR VEHICLES (71) Applicant: Carl Zeiss Jena GmbH, Jena (DE)

(72) Inventors: Daniel Thomae, Jena (DE); Roman Kleindienst, Weimar (DE); Christoph Erler, Jena (DE); Petr Vojtisek, Jena (DE); Alexandre Gatto, Bergisch Gladbach (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/840,825

(22) Filed: Jun. 15, 2022

(65) Prior Publication Data

US 2022/0307669 A1    Sep. 29, 2022

Related U.S. Application Data

(63) Continuation of application No. 16/756,148, filed as application No. PCT/EP2018/078420 on Oct. 17, 2018, now Pat. No. 11,391,435.

(30) Foreign Application Priority Data

Oct. 18, 2017    (DE) .......................... 102017124296.1

(51) Int. Cl.
*F21S 43/236* (2018.01)
*F21S 43/249* (2018.01)
*G02B 5/32* (2006.01)
*G02B 27/09* (2006.01)

(52) U.S. Cl.
CPC ........... *F21S 43/236* (2018.01); *F21S 43/249* (2018.01); *G02B 5/32* (2013.01); *G02B 27/0944* (2013.01)

(58) Field of Classification Search
CPC ........ F21S 43/14; F21S 43/236; F21S 43/247; F21S 43/249; G02B 6/0016; G02B 6/0018; G02B 6/002; G02B 6/005; G02B 6/0068; G03H 1/0248; G03H 1/2202; G03H 1/265
See application file for complete search history.

(56) References Cited

U.S. PATENT DOCUMENTS

| | | | |
|---|---|---|---|
| 4,711,512 A | 12/1987 | Upatnicks | |
| 5,101,193 A * | 3/1992 | Smith | .................... B60Q 1/302 362/509 |
| 5,106,174 A * | 4/1992 | Smith | ...................... G02B 5/32 359/24 |
| 5,135,751 A | 8/1992 | Henry et al. | |
| 5,341,230 A * | 8/1994 | Smith | ................ G02B 27/0081 359/13 |

(Continued)

FOREIGN PATENT DOCUMENTS

| | | |
|---|---|---|
| CN | 104777535 A | 5/2017 |
| DE | 69311704 T2 | 10/1997 |

(Continued)

OTHER PUBLICATIONS

English Machine Translation of JPH 08-108793 provided by Espacenet (Year: 1994).*

(Continued)

*Primary Examiner* — Zheng Song
(74) *Attorney, Agent, or Firm* — KUSNER & JAFFE (57) ABSTRACT

Light-emitting devices for motor vehicles are provided, which comprise a reflection hologram. A light-guiding body is provided to direct light from a light source arrangement (4) onto the hologram.

28 Claims, 5 Drawing Sheets

(56) References Cited

U.S. PATENT DOCUMENTS

| | | | |
|---|---|---|---|
| 5,347,435 A | 9/1994 | Smith et al. | |
| 5,634,708 A * | 6/1997 | Koie | B60Q 1/302 362/23.15 |
| 5,711,592 A | 1/1998 | Yoshihiko | |
| 5,745,266 A * | 4/1998 | Smith | F21S 43/239 359/13 |
| 6,062,710 A | 5/2000 | Hewitt | |
| 6,580,529 B1 | 6/2003 | Amitai et al. | |
| 10,414,333 B2 | 9/2019 | Muegge | |
| 2002/0135830 A1 | 9/2002 | Endo | |
| 2005/0201120 A1 | 9/2005 | Nesterenko | |
| 2006/0002101 A1 | 1/2006 | Wheatley | |
| 2006/0203486 A1* | 9/2006 | Lee | G02B 6/10 362/244 |
| 2011/0162712 A1 | 7/2011 | Tillin | |
| 2011/0194163 A1 | 8/2011 | Shimizu | |
| 2011/0297229 A1 | 12/2011 | Gu | |
| 2012/0002197 A1 | 1/2012 | Havermeyer | |
| 2013/0016410 A1 | 1/2013 | Futterer | |
| 2014/0092321 A1 | 4/2014 | Kurashige | |
| 2014/0268867 A1 | 9/2014 | Fiorentino | |
| 2015/0124303 A1* | 5/2015 | Dimov | G03H 1/0005 359/15 |
| 2015/0220058 A1 | 8/2015 | Mukhtarov | |
| 2016/0274360 A1 | 9/2016 | Inagaki | |
| 2017/0059759 A1 | 3/2017 | Anderson | |
| 2017/0090096 A1 | 3/2017 | Fattal | |
| 2017/0267164 A1* | 9/2017 | Muegge | B60Q 1/302 |
| 2018/0058656 A1 | 3/2018 | Naron | |
| 2018/0074457 A1 | 3/2018 | Jolly et al. | |
| 2018/0239096 A1 | 8/2018 | Houbertz | |
| 2019/0129360 A1 | 5/2019 | Karthaus | |
| 2019/0351814 A1 | 11/2019 | Furubayashi | |
| 2020/0409305 A1 | 12/2020 | Erler | |
| 2021/0141226 A1* | 5/2021 | Cakmakci | G02B 5/3025 |

FOREIGN PATENT DOCUMENTS

| | | | |
|---|---|---|---|
| DE | 102011079127 A1 | 1/2013 | |
| DE | 202014003241 U1 | 8/2015 | |
| DE | 102014223933 A1 | 5/2016 | |
| DE | 102014117842 A1 | 6/2016 | |
| DE | 102016107307 A1 | 10/2017 | |
| DE | 102016117557 A1 | 3/2018 | |
| DE | 102016117969 A1 | 3/2018 | |
| DE | 102018116670 A1 | 1/2020 | |
| EP | 0407773 A2 | 1/1991 | |
| EP | 0452815 A1 | 10/1991 | |
| GB | 2540474 A | 1/2017 | |
| JP | H03-121942 A | 5/1991 | |
| JP | H06230225 A | 8/1994 | |
| JP | H07192510 A | 7/1995 | |
| JP | H 07-228189 * | 8/1995 | G03H 1/2202 |
| JP | H08 108793 A | 4/1996 | |
| JP | 2001074894 A | 3/2001 | |
| WO | WO1998/025169 A1 | 6/1998 | |
| WO | WO-2004097498 A1 * | 11/2004 | G02B 27/0081 |
| WO | WO2018/054985 A1 | 3/2018 | |

OTHER PUBLICATIONS

International Search Report from corresponding International Patent Application No. PCT/EP18/78420, dated Dec. 6, 2018.

Office Action dated Aug. 2, 2021 from corresponding Chinese Patent Appl. No. 201980046698.1.

International Search Report from corresponding International Patent Application No. PCT/EP19/67965, dated Sep. 25, 2019.

Peercy M S et al: "Wavelength selection for true-color holography", Applied Optics, Optical Society of America, Washington, DC; US, Bd. 33, Nr. 39, Oct. 10, 1994.

Philippe Gentet et al: "New LED's wavelengths improve drastically the quality of illumination of pulsed digital holograms", Digital Holography and Three-Dimensional Imaging, Jan. 1, 2017.

International Search Report from corresponding International Patent Application No. PCT/EP19/67122, dated Oct. 18, 2019.

* cited by examiner

ILLUMINATION DEVICE FOR VEHICLES

RELATED APPLICATIONS

This is a continuation of U.S. application Ser. No. 16/756,148, filed Apr. 15, 2020, which is a U.S. National Stage Application of International Application No. PCT/EP2018/078420, filed Oct. 17, 2018, which claims priority from German Application No. DE102017124296.1, filed Oct. 18, 2017, and are hereby fully incorporated herein by reference.

FIELD OF THE INVENTION

The present application relates to light-emitting devices for vehicles, in particular light-emitting devices that may be used as signal lamps such as indicator lamps (blinkers) or brake lamps or as rear lamps (tail lamp).

BACKGROUND OF THE INVENTION

Light-emitting devices are used in vehicles firstly in order to illuminate the environment of the vehicle to enable visibility for a driver of the vehicle even in the dark, and secondly to make other persons or vehicles aware of the vehicle equipped with the light-emitting device. Examples of such light-emitting devices are front headlamps, rear lamps, brake lamps or indicator lamps.

Besides their technical function, such light-emitting devices are increasingly also being used to give vehicles of a specific brand a distinctive appearance, for example. In this case, principally the outer shape of such light-emitting devices is used as a design feature. Increasingly, the light-emission signature of such light-emitting devices is also being configured in a characteristic fashion. By way of example, characteristic light-emission signatures are used in vehicle tail lamps. At the same time, there are ever more sharply defined boundary conditions here in respect of installation space and arrangement on the vehicle, for example in order to maximally exploit a loading space width. Strongly adapted optical concepts are often necessary in order to circumvent the restrictions mentioned in the examples or in order to satisfy the boundary conditions demanded by the legislature and by the vehicle design. Mirrors, prisms and macroscopic diffusing structures are traditionally used here in order to realize desired light-emitting devices.

The German patent application DE 10 2016 117 969.8 by the applicant describes apparatuses in which holograms, in particular volume holograms, may be used to produce light-emission signatures. That application describes the use both of reflection holograms and also of transmission holograms. In transmission holograms, the hologram is illuminated from a half-space of the hologram (i.e. from a side of the hologram), while it is observed from the other half-space (from the other side of the hologram). In reflection holograms, by contrast, the illumination takes place from the same side as the observation. If a small installation space is available, this may be difficult to implement, in particular if the hologram must be arranged near the exterior side of the vehicle, because in that case, a light source for illuminating the hologram would have to be arranged outside the vehicle. On the other hand, reflection holograms have the advantage that they generally operate more wavelength-selectively than transmission holograms, i.e. only light of a narrow wavelength range is imaged as a light-emission signature. This results in the fact that, even if a relatively broadband light source is used, such as a red light-emitting diode, the light-emission signature produced always appears substantially with the same wavelength. This is desirable because, owing to minor deviations of the spectral sensitivity of red and green color receptors in the eye, even small wavelength changes between approximately 550 nm and 640 nm result in a significant spatial shift of the color that is perceived. In addition, the problem of what is referred to as overmodulation may occur in transmission volume holograms, which basically means that an optimum layer thickness of the transmission hologram with a given geometry and a given refractive index modulation by way of the hologram depends on the wavelength, which may result in color shifts.

SUMMARY OF THE INVENTION

According to an embodiment, a light-emitting device for a vehicle is provided, comprising:
  a light source arrangement, which is arranged to emit light in the direction of a first half-space,
  a reflection hologram, which is configured to produce a light-emission signature during illumination from a direction that faces in a half-space that is located opposite the first half-space, and
  a light-guiding body with a beam deflection portion, which is configured to direct the light from the light source arrangement in the direction of the second half-space onto the hologram.

By using the light-guiding body, the light source device may be arranged next to the hologram or on a side that is opposite the side of the hologram that is ultimately illuminated, which makes installation in vehicles easier.

The beam deflection portion may be designed to direct light coming from the light source arrangement as a spherical wave onto the hologram as a plane wave. In other words, the spherical wave may be collimated.

By illuminating with an approximately plane wave, a hologram may be fully illuminated uniformly at a constant angle. In addition, a plane wave is technically easily checkable. A slight decentration of the hologram upon installation and also a slight tilting do not lead to an irregular distortion of the light-emission signature produced when using a plane wave.

The beam deflection portion may comprise a curved mirror, in particular a portion of a parabolic mirror, wherein the mirror may be configured as an off-axis mirror. In this way, light may be easily directed onto the hologram.

Alternatively, the beam deflection portion may comprise a transmissive or reflective diffractive element, e.g. a further hologram. The light source arrangement may comprise a plurality of light sources, wherein the beam deflection portion comprises separate portions for the plurality of light sources. The portions may be configured here such that the light from all the portions is radiated onto the hologram from the same direction. In this way, larger holograms may be fully illuminated and/or higher luminances may be achieved.

The plurality of portions may also be configured to direct light at different angles onto the hologram for selectively producing different light-emission signatures. Different light-emission functions may be integrated in this way.

The beam deflection portion may be designed to direct at least one part of the light from the light source arrangement to the hologram via a reflection at one side of the light-guiding body.

The side may comprise here a side of the light-guiding body that is located opposite the hologram.

The hologram may have a portion of reduced efficiency, wherein the light-guiding body is configured to direct non-diffracted light from the portion of reduced efficiency to a further portion of the hologram.

In this way it is possible to fully illuminate larger holograms with comparatively thin light-guiding bodies. The thickness of the light-guiding body may be reduced in this manner.

The light-guiding body may have a curved light input coupling face for coupling in light from the light source, wherein a center of curvature of the light input coupling face is located at the location of a light source of the light source arrangement. In this way, refraction effects upon input coupling of the light are minimized because light rays from the light source are incident on the light input coupling face substantially perpendicularly.

The light-guiding body may also have a, or the, curved light input coupling face for coupling in light from the light source, wherein a combination of the curved light input coupling face and the beam deflection portion is designed to direct light coming from the light source arrangement as spherical wave onto the hologram as a plane wave. A collimation function may thus be "distributed," as it were, on the light input coupling face and the beam deflection portion, allowing greater design freedom.

The light-guiding body may have a refractive index of approximately 1 in a light-guiding core, i.e. a region in which the light is guided in the light-guiding body, in particular it may be filled with air. However, the refractive index may also differ from 1 if the light-guiding core is filled with a material other than air.

The light source arrangement may be formed by one or more approximate point light sources. In this way, it is possible to improve collimation of the light through the beam deflection region or other components and/or to obtain a better quality of the light-emission signature produced by the hologram (e.g. less "smearing").

BRIEF DESCRIPTION OF THE DRAWINGS

Embodiments are explained in greater detail below on the basis of embodiments and with reference to the accompanying drawing, in which.

DETAILED DESCRIPTION OF THE INVENTION

Various embodiments are explained below with reference to the accompanying drawing. It should be noted that these embodiments merely serve illustrative purposes and should not be construed as limiting. Moreover, elements of different embodiments may be combined with one another in order to form further embodiments. Variations, modifications and details which are described for components of one of the embodiments are also applicable to corresponding components of other embodiments.

Figures 1, 2A:
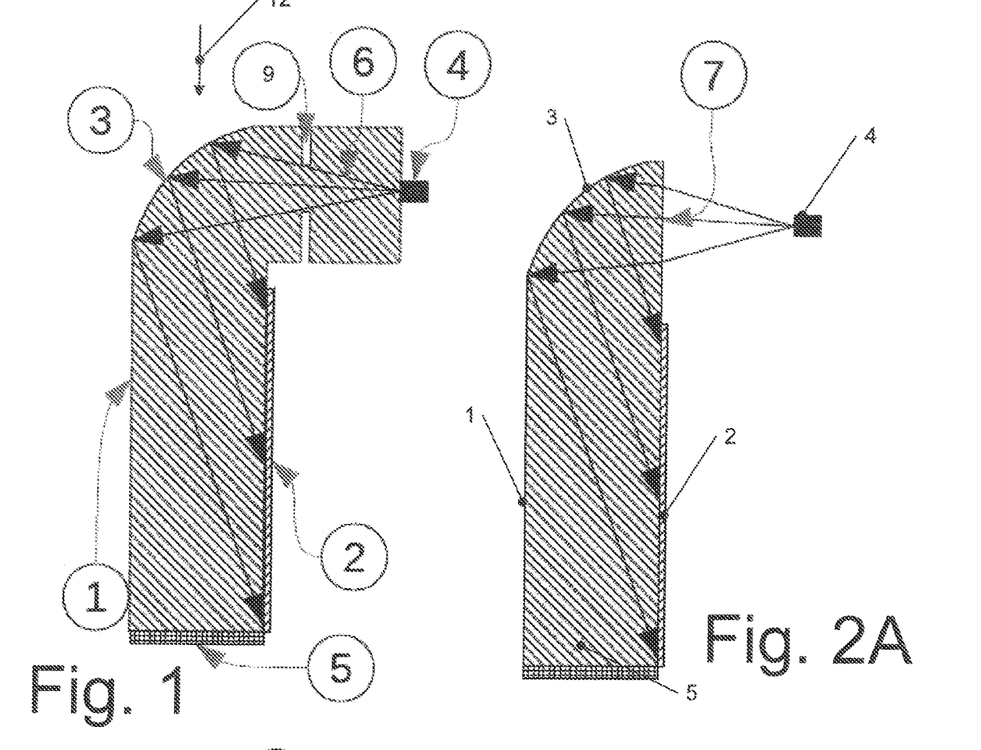
FIG. 1 shows a sectional view of a light-emitting device in accordance with an embodiment.
FIGS. 2A and 2B show sectional views of a light-emitting device in accordance with further embodiments.

FIG. 1 shows a sectional view of a light-emitting device in accordance with an embodiment. The light-emitting device of FIG. 1 comprises a light source arrangement 4, which may have one or more light-emitting diodes, for example. In addition, the apparatus of FIG. 1 has a reflection hologram 2, which produces a light-emission signature upon illumination with light from the light source arrangement 4, i.e. which diffracts or scatters light in a directed manner to cause a desired light-emission impression.

In the embodiment of FIG. 1, beams 6 travel from the light source arrangement 4 into a light-guiding body 1, which has a beam deflection region 3. The beams 6 are deflected in the beam deflection region 3 such that they illuminate the reflection hologram. An image is then produced on the same side, i.e. in the same half-space from which illumination also takes place, which in FIG. 1 is on the left-hand side of the reflection hologram 2. The light source arrangement 4 may in this way be arranged to emit in the direction of a half-space that is located on the left in FIG. 1, and the hologram is still illuminated at an appropriate angle of a half-space that is located in the direction of on the right in FIG. 1 owing to the light-guiding body 1 with the beam deflection region 3. In this way, the light-emitting device may be arranged on an exterior side of a vehicle. The refractive index of the light-guiding body 1 is here preferably as close as possible to the refractive index of the hologram 2 and any carrier or adhesive layers so as to keep reflection losses at internal interfaces low.

The beam deflection region 3 is here preferably designed such that the light from the light source device 4, which substantially corresponds to a beam 6 from a point light source in the illustrated example, is converted into a plane wave, which is incident on the reflection hologram 2 at an angle. The reflection hologram 2 has a corresponding acceptance region, so that the light that is incident on the reflection hologram 2 at said angle produces a corresponding image. This may be achieved for example by exposure likewise taking place from this angle when producing the hologram.

The use of at least approximately plane waves during the illumination of the hologram 2 has various advantages. Since the angle of incidence during illumination with plane waves in combination with a plane hologram 2 remains identical over the entire face of the hologram, there is no decrease in a local illuminance on the hologram 2 by way of the projection of the light from the light source arrangement 4 onto the face of the hologram. In addition, a slight decentration of the hologram upon installation or slight tilting does not result in an irregular distortion of the signal produced by the hologram, i.e. the light-emission signature. Finally, a plane wave is technically easily checkable, whereby a clear interface between the light-guiding body 1 and the hologram 2, which may be e.g. a foil, is defined.

One potential problem when illuminating with plane waves lies in the residual divergence of the approximately collimated plane wave coming from the beam deflection region 3, which is the result of the finite focal length of the beam deflection region 3 and the finitely small light-emission face of the light source device 4. In other words, the light source device 4 has a particular volume from which light is emitted, which corresponds to a light-emission face "viewed" from the beam deflection region. The use of extensive light source devices 4, as represented e.g. by a tungsten filament of a halogen lamp, results in smearing of the scattering function stored in the hologram. For this reason, the use of light source devices that use approximate point light sources is preferred as part of this application. Approximate point light sources, in simplified form for short also referred to as point light sources, are understood to mean within the context of this application light sources having a light-emission face of less than 4 mm$^2$, in particular less than 2 mm$^2$, preferably less than 1.1 mm$^2$, and in particular less than 0.3 mm$^2$. The light-emission face is the face from which the approximate point light source emits light in the direction of the light-guiding body 1, e.g. "viewed" from the beam deflection region 3. Such approximate point light sources are for example commercial light-emitting diodes (LEDs), in which the light emission is produced in a small region of a pn-junction.

The beam deflection region 3 may thus serve in particular as one or more collimators for imaging light from one or more light sources as a plane wave, i.e. to infinity.

The beam deflection region 3 may be designed in particular as a mirror, in particular as an off-axis mirror (i.e. the axis of symmetry of the illumination does not match the axis of symmetry of the mirror), for example an off-axis parabolic mirror. In principle, however, other types of mirrors are also possible, e.g. ellipsoidal mirrors. In addition, a stop 9 for narrowing the beam may be provided. The use of off-axis mirrors has the advantage that the light sources of the light source arrangement may be cooled better by large heat sinks, which is frequently required in high-performance light-emitting diodes used in the automotive sector. In the case of an on-axis parabolic mirror segment, such a heat sink would trim the collimated beam.

At one end of the light-guiding body 1, a face 5 that absorbs light reaching it is additionally provided to prevent or at least minimize uncontrolled exiting of light and undesirable extraneous light effects owing to multiple reflections in the light-guiding body 1. The face 5 here represents only an exemplary arrangement of a light absorber. A light absorber may for example also be arranged at an angle that deviates from 90° relative to a face of the hologram 2 in order to not direct e.g. residual reflections of an absorbing paint coating in the direction of the vehicle exterior. The light-guiding body may also be provided with an absorber layer on other interfaces, which are not necessary for the optical function.

The embodiment of FIG. 1 serves below as a basis for further embodiments, which describe variations and modifications. In this case, identical elements are provided with the same reference signs to prevent repetitions.

When using an off-axis parabolic mirror as the beam deflection region 3, the space between the light source arrangement 4 and the beam deflection region 3 is preferably made from a medium (material) having a homogeneous refractive index corresponding to the refractive index of the light-guiding body. As is illustrated in FIG. 2A, it is also possible to deviate therefrom for example because installation space or weight is intended to be saved. In FIG. 2A, the first part of the path from the light source arrangement 4 to the beam deflection region 3 is filled with a first medium, which may be for example air having the refractive index n=1.0, and a second part of the path is filled with the medium of the light-guiding body. Without loss of generality, the latter may be, for example, a plastic having the refractive index n=1.5, but other materials having different refractive indices are also possible.

For the wave illuminating the hologram 2 furthermore to represent a plane wave, the beam deflection region 3 and/or the input coupling face of light from the light source arrangement 4 into the light-guiding body 1, which is provided with the reference sign 7, must be modified compared to FIG. 1. The input coupling face 7 is embodied in FIG. 2A as a planar face, wherein the surface normal of the input coupling face 7 is perpendicular to the chief ray of the beam that is emitted by the light source arrangement 4 onto the beam deflection region 3. Owing to the refraction of the rays coming from the light source arrangement 4, at the input coupling face 7 spherical aberration occurs, which means that no plane wave is produced in the direction of the hologram 2 owing to the use of an off-axis paraboloid in the beam deflection region 3, but rather a plane wave that is provided with the wavefront aberration spherical aberration. In the case of sufficiently large spherical aberration, this may result in a distortion of the light-emission signature that is stored in the hologram and reproduced upon illumination.

This problem may be solved in FIG. 2A by the mirror in the beam deflection region being replaced by a freeform mirror, which deviates slightly from the shape of an off-axis parabolic mirror, to correct the wavefront aberration. If the input coupling face 7 is tilted relative to the chief ray of the beam emitted by the light source arrangement 4 onto the beam deflection region 3, additional wavefront aberrations are also produced, such as e.g. coma and astigmatism, which may likewise be corrected by a suitable freeform mirror in the beam deflection arrangement 3.

Another possible correction for minimizing the spherical aberration and other wavefront aberrations owing to refraction at the input coupling location 7 is the lowering of the refractive index of the light-guiding body 1 in FIG. 2A, which may reach n=1.0 in the limit case, which corresponds to an air-filled hollow body. The disadvantage of this solution is the limited material choice for the carrier material of the hologram, for which only few commercially available materials exist that often have a refractive index of around n=1.5 or n=1.6. If the refractive index of the light-guiding body 1 deviates strongly from the refractive index of the material of the hologram 2, much light is lost owing to Fresnel losses at the interface between the light-guiding body 1 and the hologram 2.

Figures 2B, 3A:
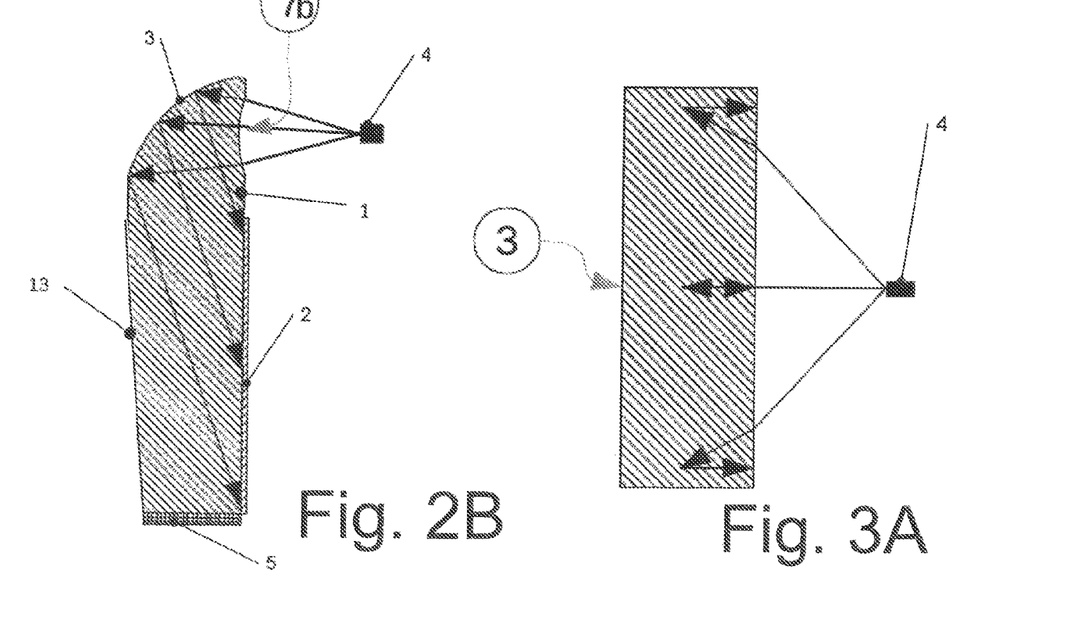
FIGS. 3A and 3B show possible views of the light-emitting device of FIG. 2A from a different direction.

FIG. 2B shows an alternative embodiment, which compensates the wavefront aberration, caused by traveling a part of the distance between the light source arrangement 4 and the beam deflection arrangement 3 in a medium having a different refractive index than that of the light-guiding body 1A, by adapting the input coupling face 7b. The face 7b here has a concentric design with respect to the light source 4, i.e. the center of curvature of 7b is located in the light source 4. Each of the rays propagating from the light source 4, which should approximately be considered to be a point light source, to the beam deflection region 3 is incident here perpendicularly on the input coupling face 7b, with the result that no aberrations due to the transition from the ambient medium, such as air, into the light-guiding body 1 occur. The form of the input coupling face thus represents a degree of freedom in design, which is used in the case of the input coupling face 7b to compensate wavefront aberrations.

This degree of freedom, however, may also be used in another way to distribute the collimation function for collimating the light coming from the light source 4 substantially as desired between the input coupling face 7b and the beam deflection region 3. It is one option to embody the input coupling face 7b as a convex lens face and to thus perform the collimation at this face, as a result of which the beam deflection region 3 would be provided with a radius of curvature of infinity, which corresponds to a plane mirror. The distribution between two faces may also be performed for different directions of the spherical wave emitted by the light source 4, for example by the input coupling face having a convex cylinder face that performs the collimation in a first direction (a first section) and the beam deflection region 3 having a cylinder-like shape that performs a collimation in a second direction (a second section). The first direction and the second direction may be approximately perpendicular (e.g. 90°+/−5° or +/−1°) with respect to one another, which has the result that the cylinder axes of the input coupling face and of the beam deflection portion are likewise approximately perpendicular with respect to one another.

The exit face, denoted with 13, through which light diffracted by the hologram leaves the lamp is furthermore modified. The exit face 13 may in this case, as is illustrated in FIG. 2B, be planar and tilted with respect to the hologram 2. However, other shapes, in particular spheres, cylinders or toroidal surfaces, of the exit face 13 are also possible. These shapes increase the efficiency when coupling the radiation out after diffraction at the hologram 2 in the direction of the vehicle exterior. If the exit face 13 is embodied in the form of a cylinder having an axis that points upwardly, for example, in the installed vehicle, it is preferred also for the face of the hologram 2 to curve in the same way so as to keep the material thickness of the light-guiding body constant. If this approach is furthermore combined with that shown in FIG. 6, the shape of the exit face 13 may be coupled to the shape of the face of the hologram 2, which simultaneously represents the rear-side boundary of the light-guiding body. In the case of an exit face 13 having for example a cylindrical design and a for example vertically extending cylinder axis, it is possible in such an embodiment for the face of the hologram 2 to also be embodied as a cylinder face, wherein in such an embodiment the cylinder axes of the exit face 13 and of the face of the hologram 2 are preferably located on top of one another.

In other embodiments, the light-guiding body 1 may be an air-filled hollow body. In this case, a light-guiding core of the light-guiding body 1 thus has a refractive index of 1. In the case of such an air-filled hollow body, the output coupling face is functionless for the light signal through which light diffracted by the hologram is emitted in the direction of the vehicle exterior (see 13 in FIG. 2B). Consequently, this and other interfaces of the light-guiding body that do not fulfill an optical function may be dispensed with or, in the case of the output coupling face 13 in FIG. 2B, for example, may be implemented in the form of an outer lens that is separated from the actual light-guiding body. Merely optical functional faces such as the beam deflection arrangement 3, the absorber 5, or the hologram 2 need to be present in such an air-filled hollow body, as a result of which the body may then have a plurality of openings to the outside.

Figure 3B:
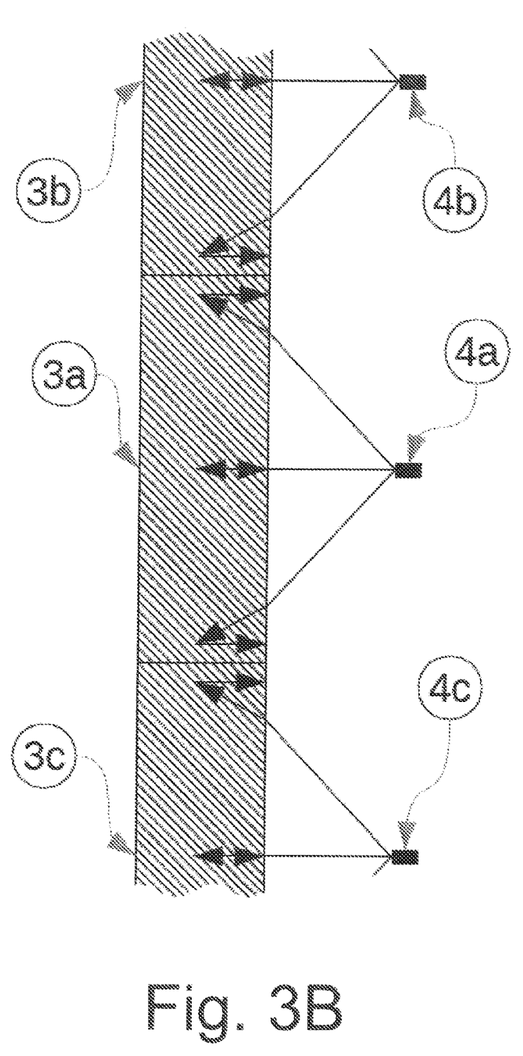

The light source arrangement 4 may, as mentioned, comprise one or more light sources. This will now be illustrated with reference to FIGS. 3A and 3B. FIGS. 3A and 3B here show plan views of the apparatus of FIG. 1 or 2A in the direction of an arrow 12 in FIG. 1.

FIG. 3A shows an arrangement with a single light source 4, which is schematically shown in the beam deflection region 3 as in FIG. 3A (cf. also FIGS. 1, 2A). By contrast, FIG. 3B shows three light sources 4a, 4b, 4c, which are arranged next to one another and are reflected in different portions 3a, 3b, 3c of the beam deflection region.

It should be noted that the number of three light sources 4a-4c in FIG. 3B should only be understood to be an example, and in fact only two light sources or more than three light sources may be used. The light sources 4a-4c and the associated beam deflection portions 3a-3c are arranged in a line in FIG. 3B. In the case of an arrangement on a cylindrically curved waveguide, the light sources 4a-4c and the beam deflection portions 3a-3c are oriented radially around the center of the lateral cylinder surface. In other words, various arrangements are possible.

In FIG. 3B, the light sources 4a-4c are arranged one behind the other in the view of FIG. 1 or 2. Further options for arranging a plurality of light sources will now be explained with reference to FIGS. 4-6.

Figure 4:
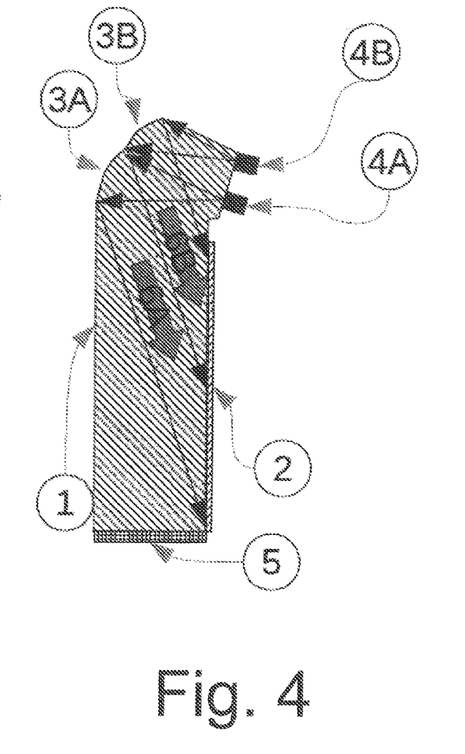
FIG. 4 shows a sectional view of a light-emitting device according to a further embodiment.

FIG. 4 shows a sectional view of a light-emitting device in accordance with an embodiment corresponding to the view of FIGS. 1 and 2. In the embodiment of FIG. 4, the light source arrangement 4 comprises two light sources 4a, 4b, the rays of which are deflected in the form of beams 6a, 6b by respectively assigned parts 3a, 3b of the beam deflection region 3. In particular, the regions 3a, 3b may in each case be off-axis mirrors, such as off-axis parabolic mirrors. However, as is shown in FIG. 2B, combinations of refractive and reflective elements are also possible. It is possible here, in correspondence with FIG. 4, for every light source to have a dedicated refractive input coupling face, although they also have a common input coupling face.

By using a plurality of light sources, overall a higher light intensity may be attained, and in addition the entire emission region of the light source arrangement may be enlarged with the focal length of the individual beam deflection regions staying the same, so that it is possible to fully illuminate even larger holograms with comparatively small installation space. In addition, a higher luminance may also be attained, e.g. for use as a brake light.

In the embodiment of FIG. 4, the number of two light sources 4a, 4b should also be understood to be an example only, and in fact more light sources may be provided.

Figure 5:
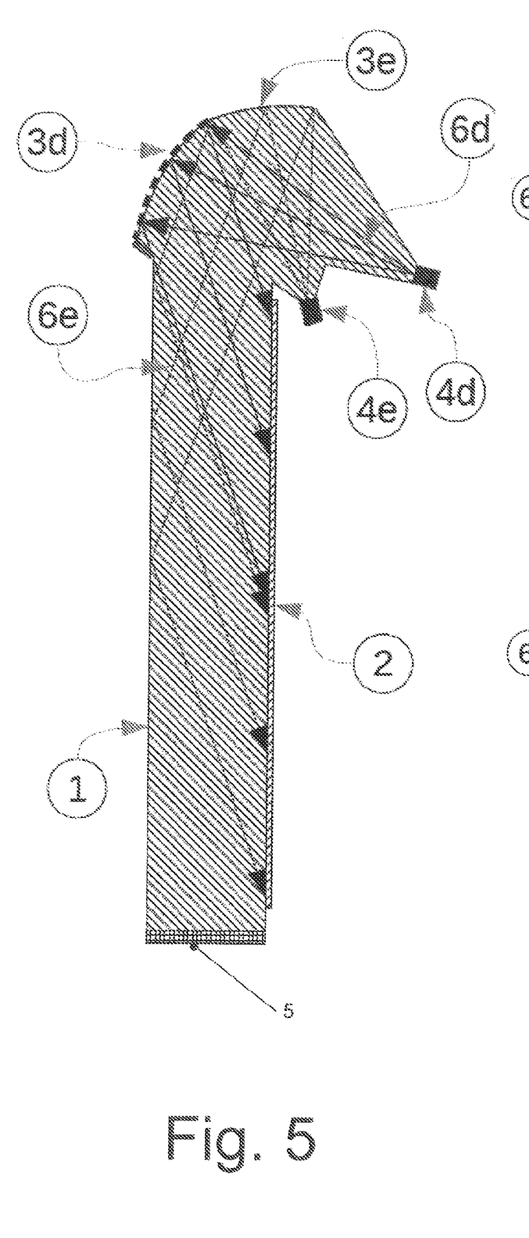
FIG. 5 shows a sectional view of a light-emitting device according to a further embodiment.

FIG. 5 shows a further embodiment. In the embodiment of FIG. 5, the light source arrangement comprises two light sources 4d, 4e. Light rays from the light sources 4d, 4e are reflected by respective portions 3d, 3e of the beam deflection portion 3. The portions 3d, 3e may again be off-axis mirrors in each case. The beams 6e coming from the light source 4e are here reflected by the portion 3e to a front side, i.e. a side lying opposite the hologram 2, of the light-guiding body 1, reflected again at said front side, and then pass to the hologram 2. Beams 6d from the light source 4d are reflected by the portion 3d directly to the hologram 2. The reflection at the front side of the light-guiding body 1 gives rise to corresponding requirements in terms of cleanliness and an absence of scratches on the front side of the light-guiding body 1, but may help reduce the thickness of the light-guiding body 1 with simultaneous full illumination of a comparatively large-area hologram 2. Again, the number of two light sources 4d, 4e should be understood to be merely an example, and more than two light sources or even one light source is also possible.

Figure 6:
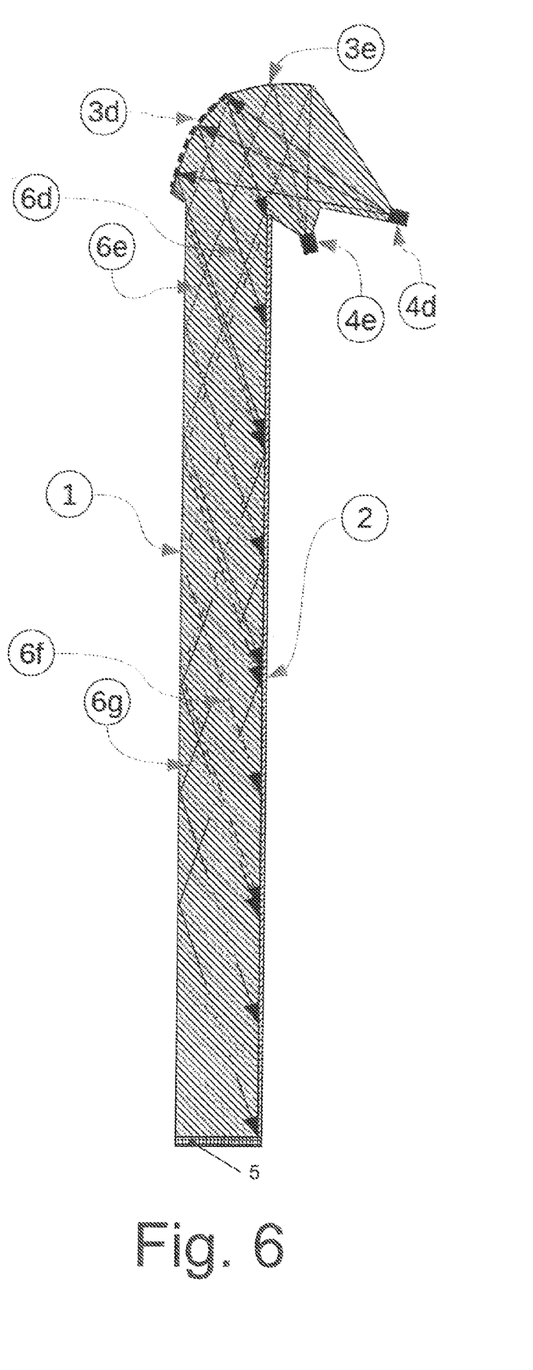
FIG. 6 shows a sectional view of a light-emitting device according to a further embodiment.

A further embodiment is illustrated in FIG. 6, which is based on the embodiment of FIG. 5 and extends it. The illumination using two light sources 4d, 4e and correspondingly two portions 3d, 3e of the beam deflection region corresponds to that of FIG. 5.

In the embodiment of FIG. 6, the beams 6d, 6e thus are likewise incident on the hologram. In contrast to FIG. 5, the hologram 2 is designed at the site of incidence of beams 6d, 6e such that it has an efficiency of significantly less than 100%, for example in the order of magnitude of 50%, e.g. between 45% and 55%, for example approximately 49%.

Consequently, only a part of the beams 6d, 6e are diffracted by the hologram 2 to produce the light-emission signature. The remaining proportion of the beams 6d, 6e undergoes total internal reflection on the rear side of the light guide 1 (of the right-hand side in FIG. 6) as beams 6f, 6g and again at the front side to illuminate a further part of the hologram 2 (the lower part in the illustration of FIG. 6). This further part then preferably has a higher efficiency, for example at or near 100%, so as to utilize the beams 6f and 6g, i.e. the initially reflected part of the radiation (for example approximately 50% of the original radiation), as fully as possible.

It is also possible with the arrangement of FIG. 6 to fully illuminate larger holograms 2 with comparatively thin light-guiding bodies 1. It is a disadvantage that the hologram 2 typically has a wavelength-dependent and a diffraction-angle-dependent efficiency profile in the region of lower efficiency (in the upper part of FIG. 6). This may lead to the reproduction of the light-emission signature by way of the upper region of the hologram deviating with respect to the color impression from the reproduction of the light-emission signature by way of the lower region (illuminated by beams 6f and 6g). The principle of FIG. 6 may also be combined with that from FIG. 3B to the effect that the illuminated wave is provided via only one light source (4a, . . . ) rather than the two light sources 4d and 4e (with the respectively assigned beam deflection regions 3d and 3e). With the beam cross section remaining the same, the beam deflection region 3a may therefor be made wider. The taper to the desired thin light-guiding body in the region of the hologram 2 may then take place at the location where the beams 6d have their last contact with the output coupling face 13.

The embodiments illustrated with reference to FIGS. 1-5 are also combinable in other ways. For example, regions of the beam deflection portion 3 that correspond to light sources (for example facets of a parabolic mirror) may be arranged next to one another both in the view of FIG. 4 and also next to one another in the plan view in FIG. 3B, with the result that a two-dimensional array of light sources is obtained.

FIGS. 1-5 show light-emitting devices that may fulfill a function in a motor vehicle, for example may serve as tail lamps, brake lamps or blinkers. Frequently, a plurality of functions, such as rear light, brake light and indicator light, are integrated in modern tail lamps. Such integration is also desirable in tail lamps that use holograms for image production, in particular reflection holograms as explained with reference to FIGS. 1-5. Corresponding embodiments will now be described with reference to FIGS. 7 and 8.

Figures 7A, 7B:
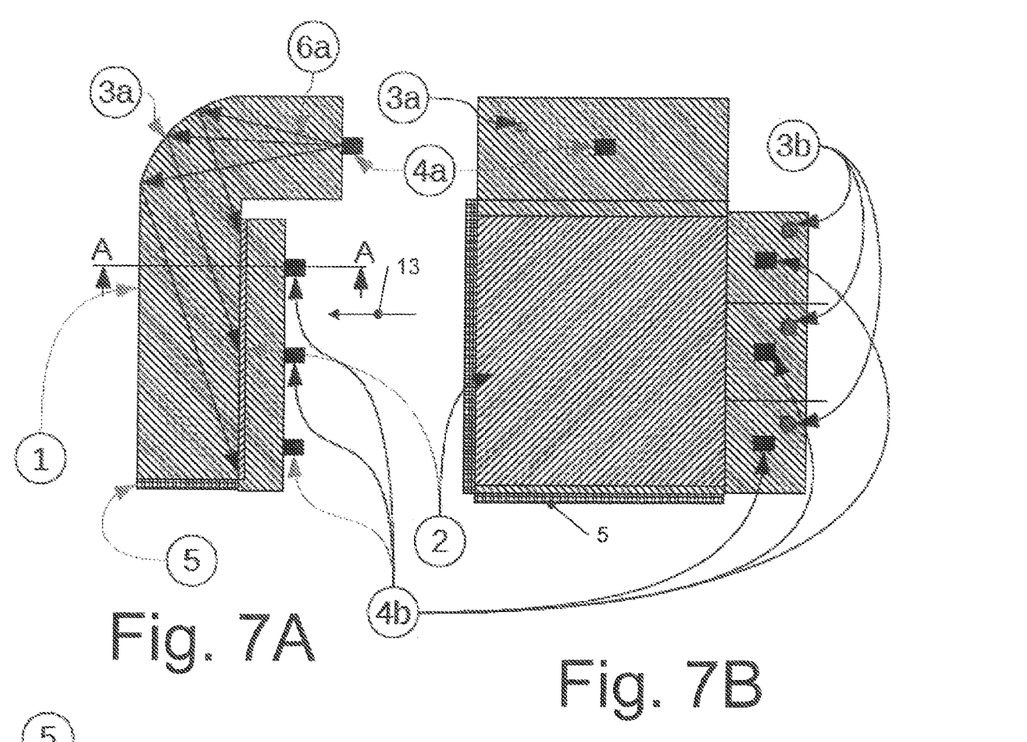
FIGS. 7A-7C show views of a light-emitting device according to a further embodiment.
Figure 7C:
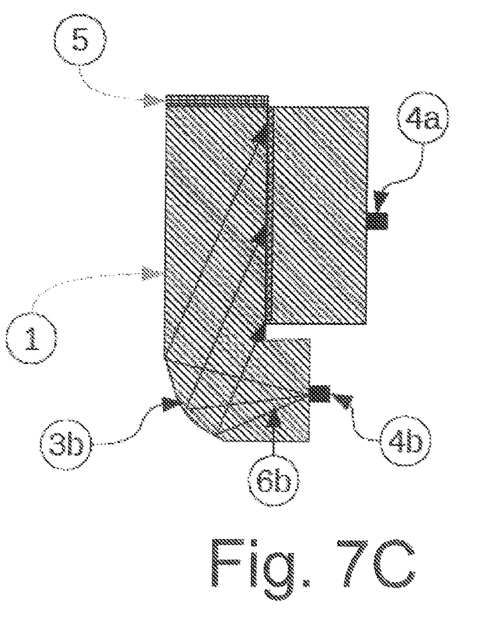

FIG. 7A shows a side view of a light-emitting device corresponding to the view of FIG. 1, FIG. 7B shows a view from the direction of an arrow 13 of FIG. 7A onto the light-emitting device of FIG. 7A, and FIG. 7C shows a sectional view along a line A-A of FIG. 7A. FIGS. 7A-7C together are also referred to as FIG. 7 below.

In this embodiment, a hologram 2 is provided, which contains a plurality of holographic structures, wherein each of them diffracts efficiently, i.e. produces a light-emission signature, only if the incident radiation comes from a specific direction of incidence. Here, the angle selectivity of holograms is thus exploited.

In FIG. 7, as may be seen in particular in FIG. 7A, light from a light source 4a is directed at an angle from above onto the hologram 2 via a beam deflection portion 3a in FIG. 7A. The beam deflection portion 3a may comprise an off-axis mirror as a collimator, as has already been discussed. This illumination substantially corresponds to the illumination illustrated in FIGS. 1 and 2. Instead of a single light source 4a, it is also possible for a plurality of light sources 4a that are arranged next to one another, as shown in FIG. 3B, to be used.

In addition, in the embodiment of FIG. 7, a plurality of light sources 4b are provided, which illuminate the hologram via a beam deflection portion 3b, which may again have one or more off-axis parabolic mirrors as collimators, from a second direction, as is evident in particular in FIG. 7C. The illumination using the light source 4a thus takes place at a different angle than using the light source 4b. Owing to the angle selectivity of holograms, different holographic structures in the hologram 2 may be addressed by way of the different illuminations and thus different signatures may be produced. In each case the illuminance on the hologram, i.e. the luminance, may vary by way of the focal lengths of beam deflection portions 3a, 3b, which are used as collimators, and by way of the number of light sources 4a, 4b used and by way of the emitted radiant intensity of the light sources 4a and 4b. For example, it is possible to make available a higher luminance for a brake light function than for a rear light because regulations require a higher luminance fora brake light.

The separate hologram functions may be provided in a common hologram layer (for example by sequential exposure during the hologram production from different directions), at least if they operate at the same wavelength (for example red light) and a high efficiency of the reflection holograms is desired. However, two holograms in two separate layers are also able to be used for both hologram functions, which are constructed as layer stacks as hologram 2.

Figure 8:
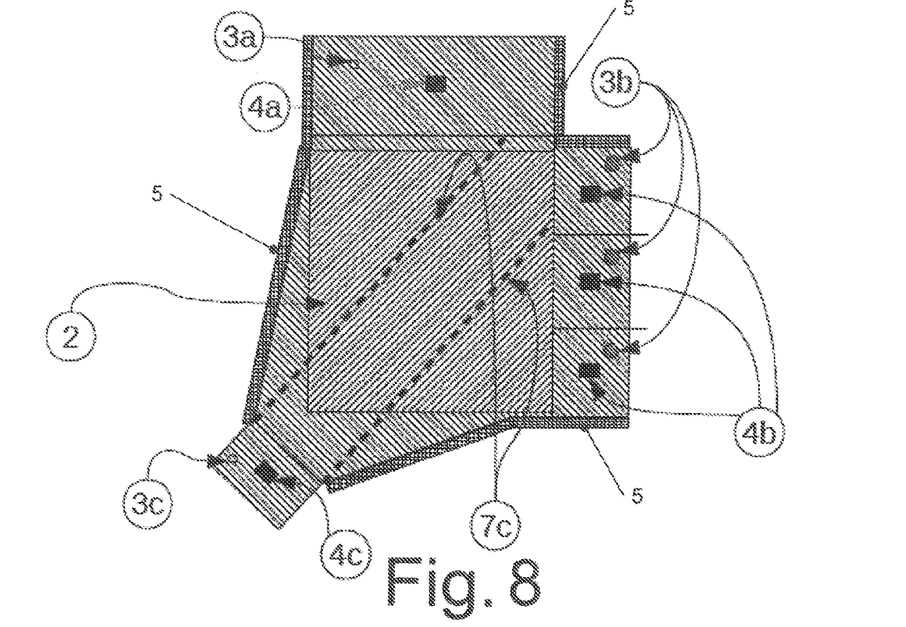
FIG. 8 shows a view of a light-emitting device according to a further embodiment.

FIG. 8 shows an extension of the embodiment of FIG. 6 by a third light source and a third beam deflection portion and shows a view corresponding to the view of FIG. 7B. Here, a third light source 4c together with a beam deflection portion 3c (for example again an off-axis parabolic mirror as a collimator) is provided to illuminate the hologram 2 from a third direction. In FIG. 8, only a part of the hologram 2 is illuminated, marginal rays are denoted with 7c. The light source 4c may be a yellow light source, for example, for a function as an indicator light. A holographic structure for this function needs to be provided accordingly only in the illuminated stripes of the hologram (bounded by the marginal rays 7c). If, as in the example with braking light, rear light and indicator light, a different wavelength is used here for the blinker, a further hologram layer, which is located at a small distance from the hologram 2 or is applied thereon, may also be used for this further wavelength. The hologram functions may, however, also be written into a single hologram layer.

Figure 9:
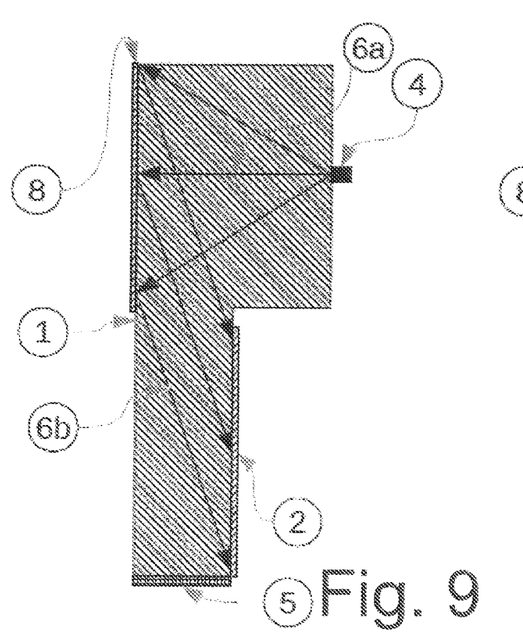
FIG. 9 shows a sectional view of a light-emitting device according to a further embodiment.

In the above embodiments, a curved mirror face, in particular an off-axis parabolic mirror, was used for beam deflection in a beam deflection region. Alternatives will now be explained with reference to FIGS. 8 and 9. FIGS. 8 and 9 each show a cross-sectional view corresponding to the view of FIGS. 1 and 2.

In FIG. 9, a diffractive off-axis reflection lens element 8 is provided as a beam deflection portion, for example a hologram, which may also provide for example individual facets or individual regions for different light sources 4. Rays 6a from the light source 4 are directed through the reflection lens element 8 as a plane wave 6b to the hologram 2. Other diffractive elements may also be used as holograms. Since the deflection of the light of the spherical wave (6a) coming from the light source 4 to the plane wave 6b takes place here via a diffractive interaction mechanism, both the deflection angle and the efficiency are dependent on the wavelength. The former, i.e. the dependence of the deflection angle, may be compensated at least partially by a dispersion of the hologram 2, at least for the central ray 6a coming from the light source 4, shown in FIG. 9. Compared to embodiments with mirrors, as in FIG. 1, however, a greater installation space may be required, at least if the diffractive reflection lens element 8 is planar and parallel to the hologram 2.

Figure 10:
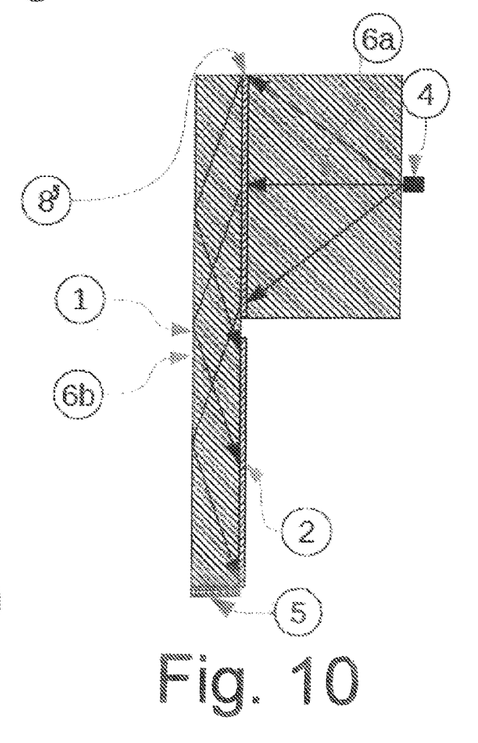
FIG. 10 shows a sectional view of a light-emitting device according to a further embodiment.

One variant of this is shown in FIG. 10, in which, instead of the reflection lens element 8, a diffractive element 8' operating in transmission, for example a transmission hologram, is used, which deflects rays 6a from the light source 4, for example a spherical wave, to a plane wave, which is reflected at the front side of the light-guiding body 1 and is directed to the hologram 2. The thickness of the light-guiding body 1 may be reduced thereby. In addition, the diffractive element 8' may be arranged together with the hologram 2 for example on a common foil. A disadvantage is that the efficiency of the element 8' as a transmitting element is generally wavelength-dependent.

Such diffractive elements 8, 8' may also be used in other embodiments shown, for example in FIG. 5, FIG. 6 or FIG. 7.

It is evident from the above description of various variations and modifications that the embodiments serve only illustrative purposes and should not be construed as limiting.

What is claimed is:

1. A light-emitting device for a vehicle, comprising:
   a light-guiding body;
   a light source arrangement configured to emit light in the direction of a first half-space and into the light-guiding body;
   a reflection hologram attached to the light-guiding body and configured to produce a light-emission signature during illumination in a direction that faces in a second half-space located opposite the first half-space; and
   a diffractive element attached to the light-guiding body and configured to receive the light from the light source arrangement and redirect the light for illumination of the hologram, the diffractive element including a first surface and a second surface,
   wherein the second surface of the diffractive element and a surface of the reflection hologram that receives light redirected by the diffractive element are arranged in the same plane, and
   wherein the diffractive element is configured to redirect the light for illumination of the hologram via a single reflection of the light received from the light source arrangement.

2. The light-emitting device as claimed in claim 1, wherein at least some light redirected by the diffractive element directly impinges on the reflection hologram.

3. The light-emitting device as claimed in claim 1, wherein the diffractive element comprises a reflective diffractive element, the first surface arranged to receive light emitted by the light source, the first surface operative to reflect the received light in the direction of the second half space.

4. The light-emitting device as claimed in claim 3, wherein the first surface of the diffractive element is a planar surface.

5. The light-emitting device as claimed in claim 4, wherein the first surface of the diffractive element and a surface of the reflection hologram that receives light from the diffractive element are parallel to each other.

6. The light-emitting device as claimed in claim 1, wherein the diffractive element comprises a transmissive diffractive element, the first surface arranged to receive light emitted by the light source and the second surface operative to redirect light received at the first surface, the second surface opposite the first surface.

7. The light-emitting device as claimed in claim 1, wherein a surface of the diffractive element that redirects light provided by the light source arrangement and a surface of the reflection hologram that receives light redirected by the diffractive element are arranged in the same plane.

8. The light-emitting device as claimed in claim 1, wherein the light-guiding body has a non-uniform thickness along a length of the light-guiding body.

9. The light-emitting device as claimed in claim 1, wherein the light source is arranged remote from the light-guiding body.

10. The light-emitting device as claimed in claim 1, wherein the diffractive element is designed to redirect light coming from the light source arrangement as a spherical wave onto the hologram as a plane wave.

11. The light-emitting device as claimed in claim 1, wherein the diffractive element is designed to redirect at least one part of the light from the light source arrangement to the hologram via a reflection at one side of the light-guiding body.

12. The light-emitting device as claimed in claim 11, wherein the side comprises a side of the light-guiding body located opposite the hologram.

13. The light-emitting device as claimed in claim 11, wherein the hologram has a portion of reduced efficiency, wherein the light-guiding body is configured to direct non-diffracted light from the portion of reduced efficiency to a further portion of the hologram.

14. The light-emitting device as claimed in claim 1, wherein the light-guiding body has a curved light input coupling face for coupling in light from the light source, wherein a center of curvature of the light input coupling face is located at the location of a light source of the light source arrangement.

15. The light-emitting device as claimed in claim 1, wherein the light-guiding body has a curved light input coupling face for coupling in light from the light source, wherein a combination of the curved light input coupling face and the diffractive element is designed to direct light coming from the light source arrangement as spherical wave onto the hologram as a plane wave.

16. The light-emitting device as claimed in claim 1, wherein the light-guiding body has in a light-guiding core a refractive index of 1.

17. The light-emitting device as claimed in claim 1, wherein the light-guiding body has in a light-guiding core a refractive index that differs from 1.

18. The light-emitting device as claimed in claim 1, wherein the light source arrangement is formed by one or more approximate point light sources.

19. The light-emitting device as claimed in claim 1, wherein the diffractive element disposed on a surface of the light-guiding body, and the diffractive element is designed to redirect light coming from the light source arrangement as a spherical wave onto the hologram as a plane wave.

20. The light-emitting device as claimed in claim 1, wherein the light emitted in the direction of the first half space and the light-emission signature produced in the direction that faces in the second half space are non-parallel to each other.

21. The light-emitting device as claimed in claim 1, wherein an angle of incidence of the light received by the diffractive element from the light source arrangement and an angle of reflection of the redirected light are not equal to one another.

22. The light emitting device as claimed in claim 1, wherein the diffractive element comprises a hologram.

23. A light-emitting device for a vehicle, comprising:
a light-guiding body;
a light source arrangement configured to emit light in the direction of a first half-space and into the light-guiding body;
a reflection hologram attached to the light-guiding body and configured to produce a light-emission signature during illumination in a direction that faces in a second half-space located opposite the first half-space; and
a diffractive element attached to the light-guiding body and configured to receive the light from the light source arrangement and redirect the light for illumination of the hologram, wherein the diffractive element comprises a transmissive diffractive element having a first surface arranged to receive light emitted by the light source and a second surface operative to redirect light received at the first surface, the second surface opposite the first surface, and,
wherein the second surface of the diffractive element and a surface of the reflection hologram that receives light redirected by the diffractive element are arranged in the same plane,
wherein the diffractive element and the reflection hologram are arranged on a common foil.

24. A light-emitting device for a vehicle, comprising:
a light-guiding body;
a light source arrangement configured to emit light in the direction of a first half-space and into the light-guiding body;
a reflection hologram attached to the light-guiding body and configured to produce a light-emission signature during illumination in a direction that faces in a second half-space located opposite the first half-space; and
a diffractive element attached to the light-guiding body and configured to receive the light from the light source arrangement and redirect the light for illumination of the hologram, wherein the light source arrangement comprises a plurality of light sources, wherein the diffractive element comprises separate portions for the plurality of light sources, and wherein the plurality of portions are configured to direct light at different angles onto the hologram for selectively producing different light-emission signatures.

25. A light-emitting device for a vehicle, comprising:
a light-guiding body;
a light source arrangement configured to emit light in the direction of a first half-space and into the light-guiding body;
a reflection hologram attached to the light-guiding body and configured to produce a light-emission signature during illumination in a direction that faces in a second half-space located opposite the first half-space; and
a diffractive element attached to the light-guiding body and configured to receive the light from the light source arrangement and redirect the light for illumination of the hologram, the diffractive element including a first surface,
wherein the first surface of the diffractive element is arranged in a first plane, and a surface of the reflection hologram that receives light from the diffractive element is arranged in a second plane parallel to the first plane.

26. The light-emitting device as claimed in claim 25, wherein the diffractive element is designed to redirect light coming from the light source arrangement as a spherical wave onto the hologram as a plane wave.

27. The light-emitting device as claimed in claim 25, wherein the diffractive element comprises a reflective diffractive element, the first surface is arranged to receive light emitted by the light source, the first surface operative to reflect the received light in the direction of the second half space.

28. The light-emitting device as claimed in claim 25, wherein the emitted light enters the light-guiding body through a third plane that is parallel to the first and second planes.

* * * * *

UNITED STATES PATENT AND TRADEMARK OFFICE
CERTIFICATE OF CORRECTION

PATENT NO. : 12,222,081 B2
APPLICATION NO. : 17/840825
DATED : February 11, 2025
INVENTOR(S) : Daniel Thomae et al.

Page 1 of 1

It is certified that error appears in the above-identified patent and that said Letters Patent is hereby corrected as shown below:

In the Specification

Column 5, Line 66:
"$n=1.5$"
Should read:
"$n\approx1.5$"

Signed and Sealed this
Sixth Day of January, 2026

John A. Squires
*Director of the United States Patent and Trademark Office*